(12) United States Patent
Pearson et al.

(10) Patent No.: US 7,061,410 B1
(45) Date of Patent: Jun. 13, 2006

(54) METHOD AND/OR APPARATUS FOR TRANSCODING BETWEEN H.264 CABAC AND CAVLC ENTROPY CODING MODES

(75) Inventors: Eric C. Pearson, Conestogo (CA); Harminder S. Banwait, Waterloo (CA)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 11/183,580

(22) Filed: Jul. 18, 2005

(51) Int. Cl.
*H03M 7/00* (2006.01)
(52) U.S. Cl. ...................................... 341/107; 341/106
(58) Field of Classification Search ................ 341/106, 341/107, 50; 382/219, 247; 375/240.12, 375/240.16
See application file for complete search history.

(56) References Cited

U.S. PATENT DOCUMENTS

| | | | |
|---|---|---|---|
| 6,917,310 B1* | 7/2005 | Pearson et al. ............... | 341/50 |
| 2004/0085233 A1 | 5/2004 | Linzer et al. | |
| 2005/0147172 A1* | 7/2005 | Winger et al. ......... | 375/240.23 |
| 2005/0258255 A1* | 11/2005 | Hellman ..................... | 235/494 |
| 2005/0259182 A1* | 11/2005 | Yu .............................. | 348/581 |

OTHER PUBLICATIONS

Sullivan, Gary, et al. Advanced Video Coding for Generic Audiovisual Services (ITU-T Rec. H.264/ ISO/IEC 14496-10), Jan. 2005.

Nunez, Chouliaras, High Performance Arithmetic Coding VLSI Macro for the H.264 Video Compression Standard IEEE Transactions on Consumer Electronics vol. 51, No. 1, Feb. 2005.
U.S. Appl. No. 10/824,152, Pearson et al., filed Apr. 14, 2004.
U.S. Appl. No. 10/837,922, Pearson et al., filed May 3, 2004.
U.S. Appl. No. 10/837,922, filed May 3, 2004, Real Time Binary Arithmetic Encoding (28 pages).
U.S. Appl. No. 10/824,152, filed Apr. 14, 2004, Low Overhead Context Initialization for Arithmetic Video Codecs (20 pages).

* cited by examiner

*Primary Examiner*—Brian Young
(74) *Attorney, Agent, or Firm*—Christopher P. Maiorana, P.C.

(57) ABSTRACT

An apparatus comprising a first circuit, a second circuit and an output circuit. The first circuit may be configured to generate (i) one of a first set of entropy coded input signals or a second set of entropy coded input signals and (ii) a data path signal. The second circuit may be configured to generate (i) a first set of entropy encoded output signals in response to decoding the second set of entropy coded input signals, or (ii) a second set of entropy coded output signals in response to decoding the first set of entropy coded input signals. The second circuit may provide real time decoding and encoding on a macroblock basis. The output circuit may be configured to present an output signal in response to (i) one of the first set of entropy coded output signals or the second set of entropy coded output signals and (ii) the data path signal.

20 Claims, 2 Drawing Sheets

METHOD AND/OR APPARATUS FOR TRANSCODING BETWEEN H.264 CABAC AND CAVLC ENTROPY CODING MODES

FIELD OF THE INVENTION

The present invention relates to video processing generally and, more particularly, to a method and/or apparatus for transcoding between H.264 CABAC and CAVLC entropy coding modes.

BACKGROUND OF THE INVENTION

An H.264 video coder/decoder (CODEC) contains, as part of a main or high profile, a context adaptive binary arithmetic-coding (CABAC) process. Arithmetic coding allows compression of multiple bins (binary information) into bits for transmission. A non-arithmetic coding form context adaptive variable length coding (CAVLC) is also supported.

The H.264 format profiles and levels constrain a maximum bit limit on a macroblock, picture, and transmission rate basis. Non-arithmetic CAVLC coding allows real-time hardware to be constructed, which will process a macroblock in a fixed maximum number of clock cycles per macroblock. For arithmetic CABAC coding however, due to the forced serial nature of CABAC combined with the possible 128:1 bin:bit expansion, guaranteed real time encoding or decoding on a macroblock basis is not feasible.

Limits on the number of bins are accounted for in the H.264 standard, but only on a picture basis. An entropy processor is built as a bit stream processor. The entropy processor will transcode, in real-time, between CABAC and CAVLC entropy coding of an H.264 bit stream. The entropy processor guarantee of real-time performance on a picture level can support multiplexed bi-directional transcoding.

Conventional approaches to CABAC encoding and decoding include (i) software as provided by JVT-050 H.264/AVC specification, (ii) the use of hardware to transcode CABAC format to another format which can be parsed at high speed, such as U.S. application Ser. No. 10/284,498, and (iii) the use of a specialty co-processor instructions to accelerate the inner loop of CABAC process as disclosed in "High Performance Arithmetic Coding VLSI Macro for the H.264 Video Compression Standard", IEEE Transactions on Consumer Electronics, Vol. 51, No. 1, February, 2005.

Conventional approaches provide software to execute parsing and reconstruction on a macroblock basis. Due to the serial nature and bin:bit expansion of the arithmetic core process, the performance needed to implement a macroblock decode in a real-time manner needs a significant silion area and/or cost, if such approaches are feasible at all. Any non-standard format or proprietary implementation needs increased area (cost) as it is necessary to support both standard formats.

The use of speciallity co-processor instructions accelerates the software alternative as provided in the JVT-050 H.264/AVC specification. However, the fundamentally serial nature and bin:bit expansion still remains. Concentrating on the inner arithmetic core does not aid with the context selection which is still performed for every bin decoded.

It would be desirable to provide a method and/or apparatus for encoding and/or decoding a compressed video stream that uses an entropy encoded method in a manner that is well suited for low cost, low power, and/or real-time devices.

SUMMARY OF THE INVENTION

The present invention concerns an apparatus comprising a first circuit, a second circuit and an output circuit. The first circuit may be configured to generate (i) one of a first set of entropy coded input signals or a second set of entropy coded input signals and (ii) a data path signal. The second circuit may be configured to generate (i) a first set of entropy encoded output signals in response to decoding the second set of entropy coded input signals, or (ii) a second set of entropy coded output signals in response to decoding the first set of entropy coded input signals. The second circuit may provide real time decoding and encoding on a macroblock basis. The output circuit may be configured to present an output signal in response to (i) one of the first set of entropy coded output signals or the second set of entropy coded output signals and (ii) the data path signal.

The objects, features and advantages of the present invention include (i) providing transcoding between H.264 CABAC and CAVLC entropy coding, (ii) implementing transcoding in a small area, (iii) guaranteed real-time performance at the picture level, (iv) allow encoding or decoding to occur in real-time in other hardware using only CAVLC syntax, and/or (v) provide verification ease due to standardized H.264 on both input and output.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
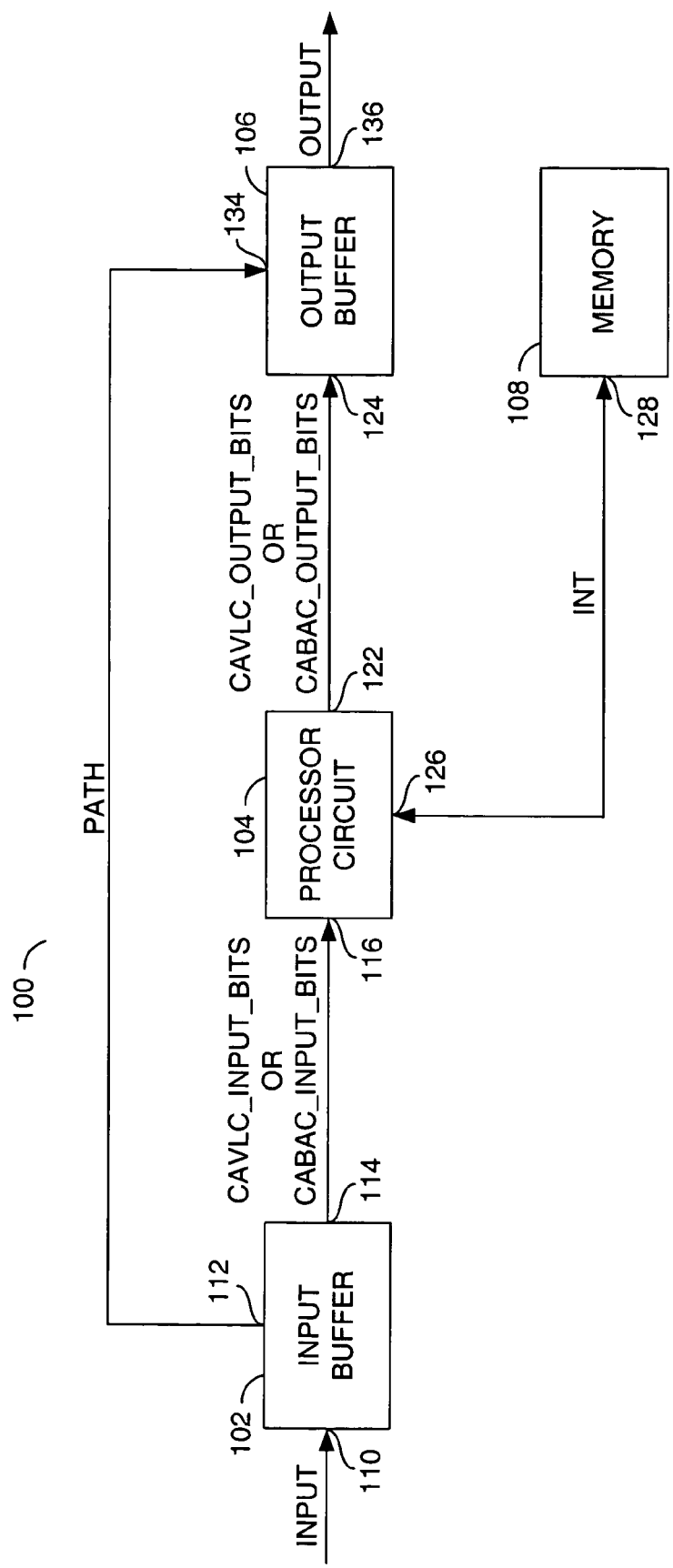
FIG. 1 is a block diagram of a preferred embodiment of the present invention.

Referring to FIG. 1, a block diagram of a system 100 is shown in accordance with a preferred embodiment of the present invention. The system 100 may be implemented to transcode between H.264 CABAC and CAVLC entropy coding modes. The system 100 (or entropy processor) generally comprises a block (or circuit) 102, a block (or circuit) 104, a block (or circuit) 106, and a block (or circuit) 108. The circuit 102 may be implemented as an input buffer. The circuit 104 may be implemented as a processor. The circuit 106 may be implemented as an output buffer. The circuit 108 may be implemented as a memory. The memory 108 may be implemented as an external memory.

The circuit 102 may have an input 110 that may receive a signal (e.g., INPUT), an output 114 that may present a signal (e.g., CABAC_INPUT_BITS) or a signal (e.g., CAVLC_INPUT_BITS) and an output 112 that may present a signal (e.g., PATH). Generally, CABAC bits or CAVLC bits are presented on the signal INPUT. An H.264 compliant encoder (not shown) may encode video data in real time to generate CAVLC bits which may be presented to the input buffer 114. The circuit 104 may have an input 116 that may receive the signal CABAC_INPUT_BITS or the signal CAVLC_INPUT_BITS. The circuit 104 may have an output 122 that may present a signal (e.g., CABAC_OUTPUT_BITS) or a signal (e.g., CAVLC_OUTPUT_BITS). The circuit 104 may have an input/output 126 that may present/receive a signal (e.g., INT). The circuit 108 may have an input/output 128 that presents/receives a signal INT. The circuit 106 may have an input 124 that may receive the signal CABAC_OUTPUT_BITS or the signal CAVLC_OUTPUT_BITS and an input 134 that may receive the signal PATH, an output 136 that may present a signal (e.g., OUTPUT).

The circuit 104 may produce encoded CAVLC data on the signal CAVLC_OUTPUT_BITS. The circuit 104 may produce encoded CABAC data on the signal CABAC_OUTPUT_BITS. In general, the circuit 104 may decode in one entropy mode and encode in another entropy mode. In one example, the circuit 104 may decode CAVLC data on the signal CAVLC_INPUT_BITS to produce encoded CABAC data on the signal CABAC_OUTPUT_BITS. In one example, the circuit 104 may decode CABAC data on the signal CABAC_INPUT_BITS to produce encoded CAVLC data on the signal CAVLC_OUTPUT_BITS. In one example, the circuit 104 may decode CAVLC data on the signal CAVLC_INPUT_BITS to produce encoded CAVLC data on the signal CAVLC_OUTPUT_BITS during header processing. During head processing, a slice header may need to be read to decode the slice. It may be easier to encode the CAVLC data in the slice header into CAVLC output bits on the signal CAVLC_OUTPUT_BITS as opposed to copying over the exact number of bits in response to reading the CAVLC data in the slice header.

Figure 2:
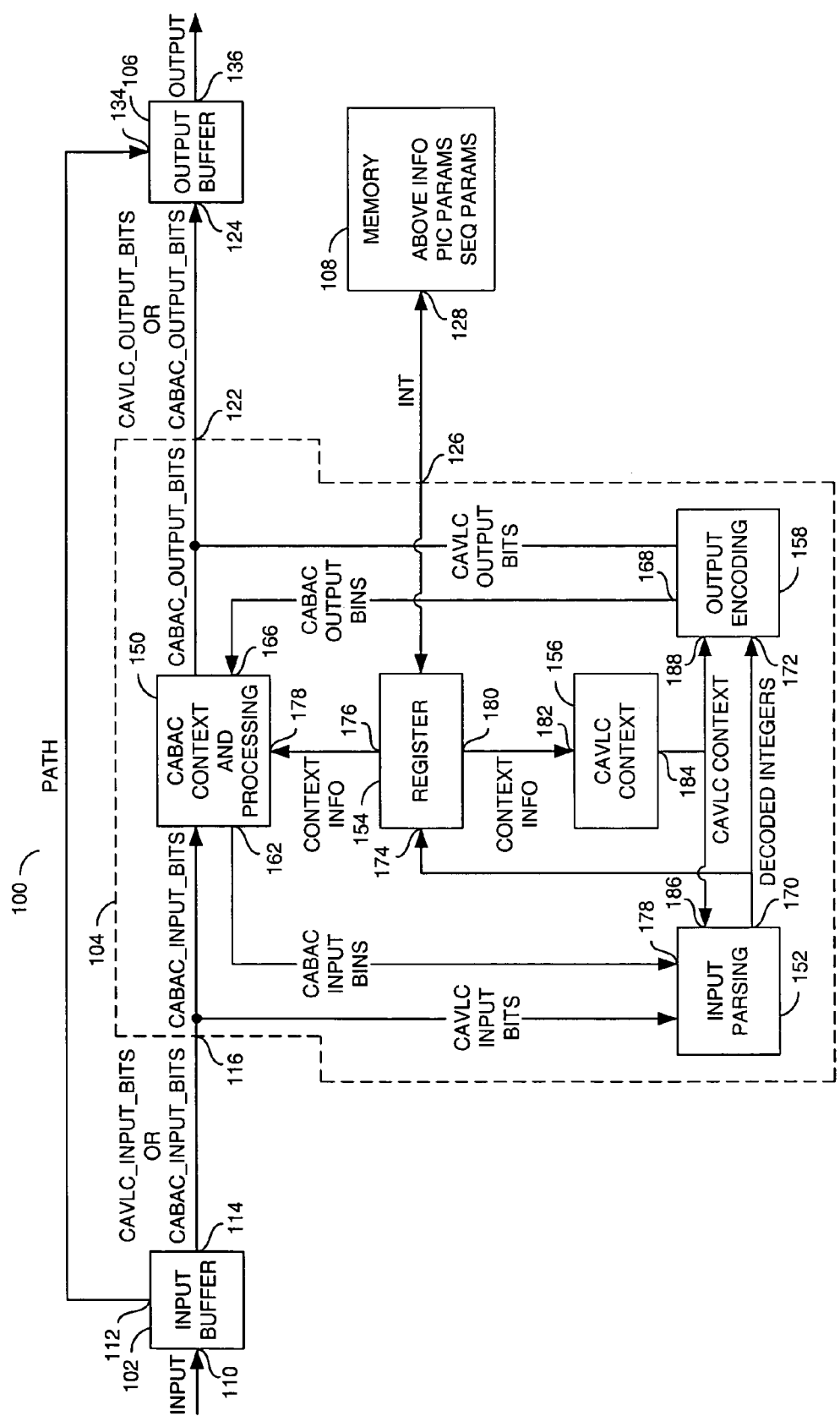
FIG. 2 is a more detailed diagram of the present invention.

Referring to FIG. 2, a more detailed diagram of a circuit 100 is shown. The processor circuit 104 generally comprises a block (or circuit) 150, a block (or circuit) 152, a block (or circuit) 154, a block (or circuit) 156 and a block (or circuit) 158. The circuit 150 may be implemented as a CABAC context and processing circuit. The circuit 152 may be implemented as an input parsing circuit. The circuit 154 may be implemented as a register circuit. The circuit 156 may be implemented as a CAVLC context circuit. The circuit 158 may be implemented as an output encoding circuit. The circuit 150 may have an output 162 that presents a signal (e.g., CABAC_INPUT_BINS) to an input 178 of the circuit 152. The circuit 150 may also have an input 166 that may receive a signal (e.g., CABAC_OUT_BINS) from an output 168 of the circuit 158. The circuit 152 may have an output 170 that may present a signal (e.g., DECODED_INTEGERS) to an input 172 of the circuit 158, as well as to an input 174 of the circuit 154. The circuit 154 may also have an output 176 that presents a signal (e.g., CONTEXT_INFO) to an input 178 of the circuit 150. The circuit 154 may also have an output 180 that may present the signal CONTEXT_INFO to an input 182 of the circuit 156. The circuit 156 may have an output 184 that may present a signal (e.g., CAVLC_CONTEXT) to an input 186 of the circuit 152, as well as to an input 188 of the circuit 158. The circuit 150 may present the signal CABAC_OUTPUT_BITS. The circuit 154 may present/receive the signal INT. The circuit 158 may present the signal CAVLC_OUTPUT_BITS.

The processor circuit 104 generally accepts an H.264 bit stream on the signal INPUT. The processor circuit 104 may provide another H.264 bit stream on the signal OUTPUT. The signal OUTPUT may have a selected flag (e.g., ENTROPY_CODING_MODE_FLAG) selected as 0-CAVLC, 1-CABAC so that a compliant H.264 video decoder (not shown) may reconstruct the same video sequence. The compliant H.264 video decoder may observe the flag ENTROPY_CODING_MODE_FLAG and decode either the (i) encoded CAVLC data on the signal CAVLC_OUTPUT_BITS or (ii) the encoded CABAC data on the signal CABAC_OUTPUT_BITS. In general, the flag ENTROPY_CODING_MODE_FLAG is included with the signal OUTPUT and may be set by the processor circuit 104.

The H.264 video decoder may be implemented as a CAVLC decoder. The CAVLC decoder may decode encoded CAVLC data in real time to produce video data.

The processor circuit 104 autonomously transcodes a network abstraction layer (NAL) unit without intervention. NAL units of type 1, 5, or 19 (slice data) may be transcoded, otherwise the NAL units of type 1, 5 or 19 may be copied through if the selected flag ENTROPY_CODING_MODE_FLAG is correctly set (e.g., 0_CAVLC and 1_CAVLC). NALS of type 7 (e.g., sequence parameter set) may be parsed and stored (up to 32 sets). NALS of type 8 (e.g., picture parameter sets) may be parsed and stored (up to 256 sets). The NALS of type 8 may store the flag ENTROPY_CODING_MODE_FLAG as a digital complement. Generally, any NAL type which includes a correct ENTROPY_CODING_MODE_FLAG may be copied through. The performance of the circuit 100 may allow time multiplexed high definition (HD) decoding of CABAC-to-CAVLC and standard definition (SD) encoding of CAVLC-to-CABAC using a 5 Kbyte static random access memory (SRAM).

The input buffer 102 includes a FIFO (not shown) to allow a look ahead in the H.264 bit stream presented on the signal INPUT. The CABAC context and processing module 150 may perform any one of the following functions (i) accept CABAC input bits on the signal CABAC_INPUT_BITS and produce CABAC input bins on the signal CABAC_INPUT_BINS and (ii) receive encoded CABAC output bins on the signal CABAC_OUTPUT_BINS and encode the CABAC bins into arithmetically encoded CABAC output bits on the signal CABAC_OUTPUT_BITS using neighbor information for context selection. The output buffer 106 allows multiple bits (e.g., CABAC bits or CAVLC bits) to be written in a given cycle. The input buffer 112 may transfer data directly to the output buffer 106 on the signal PATH when direct copies are used for unprocessed NAL types and/or pulse code modulation (PCM) coded macroblocks. The register module 154 combined with the external memory 128 allows neighbor context information to be made available for CABAC and CAVLC context selection. The information in the register 154 may be built up from previously decoded integers received by the register 154 on the signal DECODED_INTEGERS. The external memory 108 may allow storage of 2 previous macroblock rows for CABAC and CAVLC context information, as well as 256 picture parameter sets, and 32 sequence parameter sets.

The input parsing circuit 152 performs parsing on either the signal CAVLC_INPUT_BITS or the CABAC_INPUT_BINS on a 1 bin/bit per cycle basis. A table look up of the integer may be implemented to allow the input parsing circuit 152 to cycle an integer through on a 1 bit per cycle basis. In general, once a macroblock or macroblock pair is completed, the macroblock or macroblock pair data context info is stored in the memory 108. Once underneath the macroblock or macroblock pair, the macroblock context info may be restored from the memory 108 to the register 154. When the CAVLC context processor 152 processes CAVLC code, the CAVLC context data may be extracted from information from neighboring macroblocks (e.g., coefficient data). More specifically, the presence or absence of non-zero coefficient data as specified by the H.264 standard.

The CABAC context and processing module 150 may receive context data in the form of motion vectors on the signal CONTEXT_INFO. The output encoding circuit 158 (i) receives decoded integers, (ii) encodes the decoded integers as CAVLC code and (iii) presents the CAVLC code on the signal CAVLC_OUTPUT_BITS. The output buffer 106 presents the signal OUTPUT which may include the data on the signal CAVLC_OUTPUT_BITS. The output encoding circuit 158 may also encode the decoded integers to produce the CABAC output bins (or CABAC data). The output encoding circuit 158 may present the CABAC data on the signal CABAC_OUTPUT_BINS to the CABAC context and processing circuit 150 for arithmetic encoding. The output buffer 106 may present the CABAC output bits on the signal OUTPUT.

The processor circuit 104 may provide encoding or decoding CABAC data in a real time basis on a macroblock. The input parsing circuit 152 may parse one bin or bit per cycle. The output encoding circuit 168 may encode one bin or bit per cycle. The input parsing circuit 152 and the output encoding circuit 168 generally operate at the same time but on two successive syntax elements (e.g., separate integers or minimally decodable units) of a stream. The CABAC data may be decoded or encoded at a rate of one bin per cycle. In general, the H.264 standard limits bits/sec, macroblocks/sec, and bins/pic, since bins/pic is less than (4/3·bins/sec+96×macroblock), bins/sec generally has a limit. To encode CAVLC input bits into CABAC output bits, the circuit 152 and the circuit 158 may use, respectively, 1 cycle/bit to decode+1 cycle/bin to encode–overlap. To decode CABAC input bits into CAVLC output bits, the circuit 152 and the circuit 158 may use, respectively, 1 cycle/bin to decode+1 cycle/bit to encode–overlap. The overlap may be produced when the input parsing circuit 152 and the output encoding circuit 158 operate at the same time. The input circuit parsing circuit 152 and the output encoding circuit 158 may not always operate at the same time since the input parsing circuit 152 and the output encoding circuit 158 work on successive syntax elements.

Multiple entropy processors may be coupled to each other to encode and decode video data in real time. For example, the H.264 encoder (not shown) may present an encoded first set of CAVLC data to a first entropy processor in real time. The first entropy processor may generate an encoded first set of CABAC data in response to receiving the first set of CAVLC data. The first entropy processor may provide the first set of CABAC data to an input of a second entropy processor. The second entropy processor may produce an encoded second set of CAVLC data in response to receiving the first set of CABAC data. The H.264 compliant decoder may be coupled to the second entropy processor. The H.264 compliant decoder may decode the encoded second set of CAVLC data in real time to reproduce the video data. The CABAC data and/or the CAVLC data may be in the form of bits or bins.

The present invention may (i) provide compliant H.264 bit stream input and output, (ii) provide fully autonomous processing at the NAL, (iii) provide time shared HD decode and SD encode possible at 100 MHZ, (iv) provide bi-directional processing cycles which may be less than 1 cycle per input bit, cabac bin, and output bit, (v) support non-symmetrical aspects between CABAC and CAVLC, (vi) provide high profile CAVLC co-efficients used to support large CABAC co-efficients, (vii) provide 8×8 CABAC blocks re-encoded as 4×4 cavlc blocks, (viii) transcode CAVLC P_8×8ref0 macroblocks into P_8×8ref0 with refidx=0 for each partition, (ix) provide selectable CABAC init values for CAVLC to CABAC, and/or (x) use a small 5K byte SRAM due to the 8×8 block size limitations for HD.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    a first circuit configured to present (i) one of a first set of entropy coded input signals or a second set of entropy coded input signals, and (ii) a data path signal;
    a second circuit configured to generate (i) a first set of entropy coded output signals in response to decoding said second set of entropy coded input signals, or (ii) a second set of entropy coded output signals in response to decoding said first set of entropy coded input signals, wherein said second circuit provides real time decoding and encoding on a macroblock basis; and
    an output circuit configured to present an output signal in response to (i) one of said first set of entropy coded output signals or said second set of entropy coded output signals and (ii) said data path signal.

2. The apparatus according to claim 1, wherein said first set of entropy coded input signals comprise context adaptive binary arithmetic coding (CABAC) input bits and said first set of entropy coded output signals comprise CABAC output bits.

3. The apparatus according to claim 2, wherein said second set of entropy coded input signal comprise context adaptive variable length coding (CAVLC) input bits and said second set of entropy coded output signals comprising CAVLC output bits.

4. The apparatus according to claim 3, wherein said second circuit comprises a CABAC context and processing circuit configured to (i) generate CABAC input bins in response to receiving said CABAC input bits and (ii) generate said CABAC output bits in response to encoding CABAC output bins.

5. The apparatus according to claim 4, wherein said second circuit comprises an input parsing circuit configured to generated decoded integers in response to parsing said CAVLC input bits or said CABAC input bins.

6. The apparatus according to claim 5, wherein said second circuit comprises an output encoding circuit configured to generate said CABAC output bins or said CAVLC output bits.

7. The apparatus according to claim 5, wherein said input parsing circuit is configured to operate at a minimum rate of 1 bit or bin per cycle.

8. The apparatus according to claim 6, wherein said output encoding circuit is configured to produce encoded data at a minimum rate of 1 bit or bin per cycle.

9. The apparatus according to claim 5, wherein said CABAC context and processing circuit is configured to encode CABAC output bins at a minimum rate of one bin per cycle.

10. The apparatus according to claim 1, wherein said apparatus further comprises:
    a memory configured to store (i) one or more previous macroblock rows for above context information, (ii) a pre-determined number of picture parameter sets and (iii) a pre-determined number of sequence parameter sets.

11. The apparatus according to claim 1, wherein said second circuit comprises a register configured to provide neighbor context information to be made available for CABAC and CAVLC context selection.

12. The apparatus according to claim 1, wherein said data path signal comprises direct copies that are used for unprocessed network abstraction layer (NAL) types or pulse code modulation (PCM) coded macroblocks.

13. The apparatus according to claim 1, wherein said output signal comprises an entropy coding mode flag, wherein said entropy coding mode flag (i) produces a 0 to indicate that said output signal comprises encoded CAVLC data or (ii) produces a 1 to indicate that said output signal comprises encoded CABAC data.

14. The apparatus according to claim 1, wherein said output circuit further comprises:
a compliant H.264 decoder configured to (i) decode said output signal and (ii) generate video data, wherein said output signal comprises said second set of entropy coded output signals.

15. The apparatus according to claim 1, wherein said first circuit further comprises a first encoder configured to generate said second set of entropy coded input signals in real time in response to encoding video data.

16. A method for transcoding between different entropy codes, comprising the steps of:
(A) generating (i) one of a first set of entropy coded input signals or a second set of entropy coded input signals and (ii) a data path signal;
(B) decoding said first set of entropy coded input signals to (i) produce a second set of entropy coded output signals and (ii) allow real time decode of said first set of entropy coded input signals on a macroblock basis;
(C) decoding said second set of entropy coded input signals to (i) produce a first set of entropy coded output signals and (ii) allow real time encode of said first set of entropy coded input signal on a macroblock basis; and
(D) generating an output signal in response to (i) one of said first set of entropy coded output signals or said second set of entropy coded output signals and (ii) said data path signal.

17. A computer readable medium configured to execute the steps of claim 16.

18. An apparatus comprising:
a first circuit configured to (i) encode video data into a first set of context adaptive variable length coding (CAVLC) coded data and (ii) produce a first set of context adaptive binary arithmetic coding (CABAC) data; and
a second circuit configured to (i) encode said first set of CABAC data, (ii) generate a second set of CAVLC data, (iii) decode said second set of CAVLC data and (iv) generate said video data in response to decoding said second set of CAVLC data.

19. The apparatus according to claim 18, wherein said first circuit comprises (i) a first encoder configured to encode said video data in real time to produce said first set of CAVLC data and (ii) a first entropy processor configured to produce said first set of CABAC data in response to receiving said first set of CAVLC data.

20. The apparatus according to claim 18, wherein said second circuit comprises (i) a second entropy processor configured to produce said second set of CAVLC data in response to receiving said first set of CABAC data and (ii) a first decoder configured to decode said second set of CAVLC data in real time to produce said video data.

* * * * *